United States Patent [19]
Hara et al.

[11] Patent Number: 5,104,927
[45] Date of Patent: Apr. 14, 1992

[54] RELEASE SILICONE EMULSION COMPOSITION AND PROCESS FOR PREPARING IT

[75] Inventors: Yasuaki Hara, Annaka; Fumio Okada, Takasaki, both of Japan

[73] Assignee: Shin-Etsu Chemical Co., Ltd., Tokyo, Japan

[21] Appl. No.: 732,174

[22] Filed: Jul. 18, 1991

Related U.S. Application Data

[62] Division of Ser. No. 184,026, Apr. 20, 1988.

[30] Foreign Application Priority Data

Apr. 22, 1987 [JP] Japan .................................. 62-98894

[51] Int. Cl.$^5$ ................................................ C08K 5/24
[52] U.S. Cl. .................................... 524/731; 524/588; 524/861
[58] Field of Search .................... 524/731, 588, 861

[56] References Cited

U.S. PATENT DOCUMENTS

| | | | |
|---|---|---|---|
| 4,467,068 | 8/1984 | Maruyama et al. | 524/731 |
| 4,656,221 | 4/1987 | Kurita et al. | 524/731 |
| 4,757,106 | 7/1988 | Mayer et al. | 524/731 X |
| 4,764,576 | 8/1988 | Ogawa et al. | 524/731 X |

*Primary Examiner*—Joseph L. Schofer
*Assistant Examiner*—J. M. Reddiot
*Attorney, Agent, or Firm*—Oblon, Spivak, McClelland, Maier & Neustadt

[57] ABSTRACT

A release silicone emulsion composition comprising:
 (A) 100 parts by weight of a specific organovinylpolysiloxane;
 (B) from 1 to 50 parts by weight of a specific organohydrogenpolysiloxane;
 (C) from 0.5 part to 5 parts by weight of a platinum catalyst having a viscosity of 10 cSt or less at 25° C.;
 (D) from 1.5 to 15 parts by weight of a nonionic emulsifying agent having an average HLB of from 10 to 20, pH of 6.5 or less and an ionic conductivity of 30 $\mu\Omega^{-1}\text{cm}^{-1}$ or less; and
 (E) water.

This composition has good pot life and curability. The cured film had good release properties and residual adhesive properties of adhesives.

2 Claims, No Drawings

RELEASE SILICONE EMULSION COMPOSITION AND PROCESS FOR PREPARING IT

This is a division of application Ser. No. 07/184,026, filed on Apr. 20, 1988.

BACKGROUND OF THE INVENTION

1. Field of the Invention

This invention relates to a release silicone emulsion composition and a process for preparing it, and particularly to a silicone emulsion composition suited for use in release paper and a process for preparing it.

2. Description of the Prior Art

In general, a variety of release silicone compositions are used for the purpose of preventing adhesion or fixation that may occur between substrates such as paper and plastics, and sticky materials. Presently available as the release silicone compositions are mainly those of solvent types employing organic solvents in a large quantity, but the organic solvents are disadvantageous in that they may cause environmental pollution, so being undesirable from the viewpoint of safety and sanitation, and an expensive apparatus is required for the recovery thereof. Accordingly, what have been sought after are those employing no organic solvents, and one of them is a release silicone composition of an emulsion type, of which known are a condensation type and an addition type depending on the manner of cure reaction. Of these, the emulsion type compositions have been hitherto used, but can be used only for very special purposes because of their greatly disadvantageously short pot life. Known as the addition type compositions known to have a relatively long pot life are those prepared as mixtures of an emulsion comprising organovinylpolysiloxane, a platinum compound, an emulsifying agent and water with an emulsion comprising organohydrogenpolysiloxane, an emulsifying agent and water (Japanese Patent Publication (KOKOKU) No. 53143/1982), those prepared by an emulsification polymerization process (Japanese Unexamined Patent Publication (KOKAI) No. 52160/1979), etc.

However, the addition type release silicone composition described in Japanese Patent Publication (KOKOKU) No. 53143/1982 lacks in fast-curing properties, and also requires emulsification of two kinds of emulsions with use of a homogenizer to make processes complicate. It also has occurred that the resulting cured silicone film brings about insufficient residual adhesive properties of an adhesive when the composition is used to form a release layer of release papers. Also, the addition type release silicone composition described in Japanese Unexamined Patent Publication (KOKAI) No. 52160/1979 intended to improve the residual adhesive properties of the adhesive when the composition of Japanese Patent Publication (KOKOKU) No. 53143/1982 was used, but actually resulted in poor residual adhesive properties of the adhesive and insufficient release properties of the resulting cured silicone film.

SUMMARY OF THE INVENTION

Accordingly, an object of this invention is to provide a release silicone emulsion composition capable of forming silicone films having good release properties and exhibiting good residual adhesive properties of adhesives when used in release paper.

Another object of this invention is to provide a process for preparing the above silicone emulsion composition, which requires no special apparatus and can be simple in the preparation steps.

As such a silicone emulsion composition, this invention provides a release silicone emulsion composition comprising;

(A) 100 parts by weight of at least one polymer selected from an organovinylpolysiloxane represented by Formula (I) shown below and an organovinylpolysiloxane represented by Formula (II) shown below:

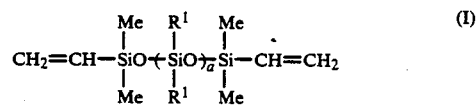

wherein $R^1$ may be the same or different and represents a monovalent hydrocarbon group containing no aliphatic unsaturated bond; and a represents an integer such that said polymer represented by Formula (I) has a viscosity of from 25 to 95 cSt at 25° C.;

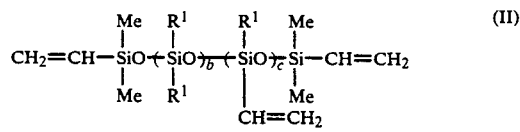

wherein $R^1$ may be the same or different and have the same definition as in Formula (I); and b and c each represent an integer such that from 1.0 to 10 mol % of all the organic groups is comprised of vinyl groups and said polymer represented by Formula (II) has a viscosity of from 30 to 5,000 cSt at 25° C.;

(B) from 1 part to 50 parts by weight of an organohydrogenpolysiloxane represented by Formula (III) shown below and having in its molecule at least 3 hydrogen atoms bonded to silicon atoms:

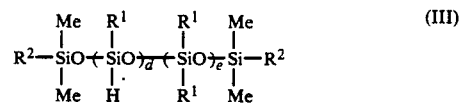

wherein $R^1$ may be the same or different and have the same definition as in Formula (I); $R^2$ may be the same or different and represents a hydrogen atom or a monovalent hydrocarbon group; d and e each represent an integer such that from 10 to 47.5 mol % of all the monovalent atoms and groups bonded to silicon atoms in said polymer is comprised of hydrogen atoms and said polymer has a viscosity of from 5 to 200 cSt at 25° C., provided that e represents an integer of 1 or more;

(C) from 0.5 part to 5 parts by weight of a platinum catalyst in a liquid state having a viscosity of 10 cSt or less at 25° C.;

(D) from 1.5 to 15 parts by weight of a nonionic emulsifying agent having an average HLB of from 10 to 20, pH of 6.5 or less and an ionic conductivity of 30 $\mu\Omega^{-1}$ cm$^{-1}$ or less; and (E) water.

The release silicone emulsion composition of this invention has good pot life, curability, release properties of the resulting cured products and the residual adhesive properties of adhesives, and is particularly suited for use in release paper. Also, it is used by merely mixing an emulsion containing the organopolysiloxanes and an emulsion containing the platinum catalyst, and therefore they can be stored separately, thus bringing about a superior shelf life. Moreover, since an water-soluble polymer can be used in combination in the composition, the composition can be applied even to porous materials and the release properties can also be readily controlled.

DETAILED DESCRIPTION OF THE INVENTION

The Component (A) organovinylpolysiloxane constituting the composition of this invention is selected from the group consisting of polymers represented by Formula (I) and ones represented by Formula (II) shown above.

In Formula (I), the monovalent hydrocarbon group containing no aliphatic unsaturated bond, represented by $R^1$ may include, for example, alkyl groups such as a methyl group, an ethyl group, a propyl group and butyl group; a cycloalkyl group such as a cyclohexyl group and a cycloheptyl group; monocyclic aryl groups such as a phenyl group and a methylphenyl group; alkoxy groups such as a methoxy group, an ethoxy group and a propoxy group; etc, and may preferably include a methyl group. Preferably at least 80 mol % of, more preferably 90 mol % or more of, all $R^1$ is required to be comprised of methyl groups. The methyl groups otherwise comprising less than 80 mol % of all $R^1$ may result in a lowering of the curability of the composition obtained, and also a lowering of the release properties of the cured product of the composition. Symbol a represents an integer by which the organovinylpolysiloxane represented by Formula (I) is made to have a viscosity of from 25 to 95 cSt, preferably from 50 to 80 cSt, at 25° C. For example, when all the $R^1$ are methyl groups, a is usually an integer of 1 to 70. The viscosity of the polymer otherwise less than 25 cSt may result in a lowering of the release properties of the cured product of the composition, and the same otherwise more than 95 cSt may result in not only a lowering of the curability of the composition obtained, but also a lowering of the residual adhesive properties of adhesives after release from the cured product of the composition, and also, in the process for preparing an emulsion composition of this invention described below, an extreme lowering of the stability of an emulsion (a first emulsion described later) obtained by emulsifying this Component A and Component B organohydrogenpolysiloxane described below with use of water and a nonionic emulsion.

In Formula (II), b and c each represent an integer by which from 1.0 to 10 mol % of, preferably from 1.5 to 5 mol % of, all the organic groups of the organovinylpolysiloxane represented by Formula (II) is made to be comprised of vinyl groups and said polysiloxane is made to have a viscosity of from 30 to 5,000 cSt, preferably from 60 to 2000 cSt at 25° C. For example, when all the $R^1$ are methyl groups, b+c is usually an integer of from 20 to 500, preferably from 50 to 300, and c is an integer of 1 to 50. The vinyl groups otherwise comprising less than 1.0 mol % of all the organic groups of the polymer may result in a lowering of the curability of the composition obtained, and the same otherwise comprising more than 10 mol % may make unstable the release properties of the cured product of the composition. The viscosity of the polymer otherwise less than 30 cSt may make the film of the cured product of the composition so brittle that it tends to be rubbed off, and the same otherwise more than 5,000 cSt may result in a lowering of the stability of the first emulsion obtained to readily cause the separation of the first emulsion into two layers.

In the above Formula (III) representing Component (B) constituting the composition of this invention, the organohydrogenpolysiloxane having in its molecule at least 3 hydrogen atoms bonded to silicon atoms, the monovalent hydrocarbon group represented by $R^2$ may include, for example, alkyl groups such as a methyl group, an ethyl group and a propyl group; alkoxy groups such as a methoxy group, an ethoxy group and a propoxy group; and the like, and may preferably include a methyl group. Symbols d and e each represent an integer by which from 10 to 47.5 mol %, preferably from 20 to 45 mol %, of all the monovalent atoms and groups bonded to silicon atoms in the polymer are made to be comprised of hydrogen atoms and the polymer is made to have a viscosity of from 5 to 200 cSt, preferably from 10 to 100 cSt, at 25° C., provided that e represents an integer of 1 or more. For example, when all the $R^1$ are ethyl groups and all the $R^2$ are hydrogen atoms, d+e is usually an integer of 10 to 200, preferably an integer of 20 to 150. Of all of the monovalent atoms and groups bonded to silicon atoms in the polymer, the hydrogen atoms otherwise comprising less than 10 mol % may result in a lowering of the curability of the composition obtained to make the film of the cured product of the composition so brittle that it tends to be rubbed off, and the same otherwise more than 47.5 mol % may result in a lowering of the curability of the composition obtained. If e=O, the stability of the first emulsion described later is lowered. The organohydrogenpolysiloxane is required to be mixed in an amount of from 1 part to 50 parts by weight, preferably 2 to 25 parts by weight, based on 100 parts by weight of Component (A). This mixing amount otherwise less than 1 part by weight may result in a lowering of the curability of the composition obtained, and the same otherwise more than 50 parts by weight may make unstable the release properties of the cured product of the composition.

Component (C) platinum catalyst constituting the composition of this invention may be any of known catalysts used for the addition reaction of the vinyl groups with the hydrogen atoms bonded to silicon atoms, and may include, for example, chloroplatinic acid, alcohol solutions of chloroplatinic acid, aldehyde solutions of chloroplatinic acid, and the like, complex salts of chloroplatinic acid with all sorts of olefin compounds. These platinum catalysts are required to be used as a liquid state or a solution having a viscosity of 10 cSt or less, preferably 5 cSt or less at 25° C. The viscosity of the platinum catalysts otherwise more than 10 cSt makes it impossible in the process for preparing the composition of this invention described below to obtain an emulsion (a second emulsion described below) by self-emulsification when this Component (C) and Component (D) noionic emulsifying agent described below are merely mixed. Such a mixture of Components (C) and (D) can not achieve sufficient effect as a catalyst if it is attempted to prepare a desired composition by adding these mixtures to the first emulsion. Also, use of this Component (C) in an overly large amount may make it possible that the effect as a catalyst can be exhibited even when the viscosity is more than 10 cSt, but may result in a short shelf life of the second emulsion and a short pot life of the composition of this invention.

This Component (C) is required to be mixed in an amount of from 0.5 part to 5 parts by weight based on 100 parts by weight of Component (A), and preferably in an amount of from 1.0 part to 3 parts by weight. This mixing amount otherwise less than 0.5 part by weight may result in insufficient dispersion in the composition of this invention to bring about insufficient effect as a catalyst. The amount more than 5 parts by weight makes short the shelf life and pot life as mentioned above.

Component (D) nonionic emulsifying agent constituting the composition of this invention may include, for example, those of alkyl allyl ether types such as polyoxyethylene nonyl phenyl ether and polyoxyethylene octyl phenyl ether; those of alkyl ether types such as polyoxyethylene lauryl ether and polyoxyethylene tridecyl ether; alkyl ester types such as polyoxyethylene oleate and polyoxyethylene laurate; etc., and these nonionic emulsifying agents can be used alone or in combination of two or more types. These nonionic emulsifying agents is required to have an average HLB of from 10 to 20, pH of 6.5 or less and an ionic conductivity of 30 $\mu\Omega^{-1}$ $cm^{-1}$ or less. The average HLB of this nonionic emulsifying agent otherwise less than 10 may make it difficult to form the second emulsion, or, if it is formed, will make it extremely unstable. In addition, the pH higher than 6.5 or the ionic conductivity greater than 30 $\mu\Omega^{-1}$ $cm^{-1}$ may also bring about such a low stability of the first emulsion that the dehydrogenation reaction may proceed with lapse of time to tend to cause change in quality. For the reasons as will be described later in connection with a process for preparing the composition of this invention, the nonionic emulsifying agent of this Component (D) is required to be mixed in an mount of from 1.5 to 15 parts by weight, preferably from 3.5 to 11 parts by weight, based on 100 parts by weight of Component (A).

There is no particular limitation on the amount of Component (E) water constituting the composition of this invention, and it may be added in an amount by which the first emulsion is made homogeneous and the silicone solids in the resulting composition of this invention come to be in the desired range.

In the composition of this invention, it is possible to optionally add activity retarders such as all sorts of organic nitrogen compounds, organic phosphorus compounds and acetylene compounds for the purpose of extension of the pot life; sorbic acid, sorbates, acetic acid, etc. as antiseptic agents; and water-soluble resins, methyl cellulose, sodium carboxymethyl cellulose, polyvinyl alcohol, etc. to prevent the composition of this invention from permeating into porous substrates or to control the release properties of the cured product obtained. There can be further optionally added in the composition of this invention leveling agents, a small amount of solvents, and, for the purpose of imparting lubricity, organopolysiloxanes having in the molecule neither of vinyl groups nor hydrogen atoms bonded to silicon atoms, so long as the effect of this invention is not hindered.

There is no particular limitation on the substrate to be coated with the composition of this invention, and may be included papers such as glassine paper, semiglassine paper, perment paper, polyethylene-laminated paper, poval-undercoated paper, art paper, kraft paper, and, besides papers, may also be included film-shaped substrates made of polyethylene, polypropylene, polystyrene, polyvinyl chloride, polyethylene terephthalate, etc.

The composition of this invention can be prepared, for example, by the following preparation process.

It is a process comprising steps of;
emulsifying:
100 parts by weight of the above Component (A) organovinylpolysiloxane;
from 1 to 50 parts by weight of the above Component (B) organohydrogenpolysiloxane;
the above Component (E) water; and
from 1 to 10 parts by weight of the above Component (D) nonionic emulsifying agent to obtain a first emulsion composition;
emulsifying from 0.5 part to 5 parts by weight of the above Component (C) platinum catalyst and from 0.5 to 5 parts by weight of the above Component (D) nonionic emulsifying agent to obtain a second emulsion composition; and
mixing the above first and second emulsion compositions.

According to this process, which requires no organic solvent, no problem of environmental pollution may be caused, no special apparatus is required, and also the composition of this invention can be prepared through simpler steps than the conventional.

In the above process, prepared is the first emulsion comprising the above Component (A) organovinylpolysiloxane, Component (B) organohydrogenpolysiloxane, Component (D) nonionic emulsifying agent and Component (E) water. The respective components used in preparing the first emulsion are required to be mixed in an amount of from 1 part to 50 parts by weight for Component (B) and from 1 part to 10 parts by weight for Component (D) based on 100 parts by weight of Component (A), preferably from 2 to 25 parts by weight for Component (B) and from 3 to 7 parts by weight for Component (D) based on 100 parts by weight of Component (A). The mixing amount for Component (D) otherwise less than 1 part by weight may not bring about any sufficient emulsification of the first emulsion, and the amount otherwise more than 10 parts by weight may cause deterioration of the curability when the first emulsion obtained is cured together with the second emulsion, and the residual adhesive properties of adhesives after release from the cured product obtained, also adversely affecting the tack adhesion retention of adhesion, etc. of the adhesive materials in contact with the cured film. There is no particular limitation on the amount of mixing Component (E), and it may be the amount by which the first emulsion is made homogeneous and the silicone solids in the resulting composition come to be in the desired range. There is no particular limitation on the manner by which these Component (A), Component (B), Component (D) and Component (E) are emulsified, but in usual cases the respective components may be mixed with use of a motor stirrer so as to be made homogeneous, followed by emulsification with use of a homogenizer, etc.

In the above process the second emulsion comprising the above Component (C) platinum catalyst and Component (D) emulsifying agent is separately prepared. Since the preparation of this second emulsion is carried out separately from the preparation of the first emulsion, nothing is questioned as to the order of the preparations of the first and second emulsions. Component (C) and Component (D) used for preparing the second emulsion is mixed in an amount of from 0.5 part to 5 parts by weight for Component (C) and from 0.5 part to 5 parts by weight for Component (D) based on 100 parts by weight of Component (A), preferably from 1.0 part to 3 parts by weight for Component (C) and from 1 part to 4 parts by weight for Component (D) based on 100 parts by weight of Component (A). The mixing amount for Component (D) otherwise less than 0.5 part by weight may not facilitate any sufficient self-emulsification of Component (C), and the amount otherwise more than 5 parts by weight may result in a lowering of the curability of the composition of this invention.

In the above process, the first emulsion and the second emulsion are then mixed to obtain the composition of this invention. There is no limitation on the time for mixing the first emulsion and the second emulsion, but they may desirably be mixed right before use in view of the pot life after mixing.

To apply the composition of this invention on the substrates, any appropriate methods are used, as exemplified by roll coating, gravure coating, air-knife coating, wire doctor coating, brush coating, etc. There is no particular limitation at this time on the amount of the composition of this invention to be coated, but it usually ranges approximately from 0.1 to 5 g/m$^2$ in terms of silicone solids. After the application, the substrate coated with the composition of this invention may be heated for approximately from 5 seconds to 3 minutes at 80° to 200° C. with use of a heating roll, heating drum, a circulating hot air drier or the like, so that the cured film is formed on the substrate.

EXAMPLES

This invention will be described below in greater detail with reference to Examples. In Examples, "part(s)" is/are part(s) by weight, and the viscosity is indicated by a value measured at 25° C.

EXAMPLE 1

Materials used are shown below.
Component (a-1):
Methylvinylpolysiloxane terminated with dimethylvinylsilyl groups at the both terminals of the molecular chain, having the backbone chain consisting of a dimethylsiloxane chain, and having a viscosity of 60 cSt (vinyl groups: about 2.5 mol % of all the organic groups).
Component (b-1):
Methylhydrogenpolysiloxane terminated with trimethylsilyl groups at the both terminals of the molecular chain, having the backbone chain comprising 90 mol % of the unit:

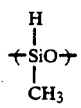

and 10 mol % of the unit:

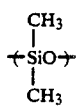

and having a viscosity of 100 cSt.
Component (c-1):

A platinum-vinylsiloxane complex salt having a viscosity of 1.5 cSt (platinum content: 100 ppm).
Component (d-1):
Polyoxyethylene nonyl phenyl ether having an HLB of 10.9, pH 5.4 and ionic conductivity of 1.1 $\mu\Omega^{-1}cm^{-1}$ (trade name: Newcall 560; available from Nippon Nyukazai Co., Ltd.).
Component (e-1): Water.

(i) By use of a homomixer and a homogenizer (pressure: 200 kg/cm$^2$, mixed were 100 parts of Component (a-1), 5 parts of Component (b-1), 4 parts of Component (d-1), 240 parts of Component (e-1), 1 part of a controlling agent represented by the formula:

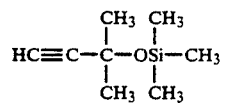

and 0.2 part of sorbic acid as an antiseptic agent to obtain a homogeneous and white emulsion. The resulting emulsion had a viscosity of 2.3 cSt.

(ii) Using a three-one motor stirrer, mixed were 2 parts of Component (c-1) and 1 part of Component (d-1), thereby very readily obtaining a transparent emulsion.

(iii) Emulsions obtained in (i) and (ii) were uniformly stirred and mixed to prepare an opaque white Emulsion Composition I.

The emulsion obtained in (i) was very stable without any change even after storage for 1 year at 25° C., that is, the initial properties were maintained.

On Composition I, the curability, release properties of the cured product obtained, and the residual adhesive properties of adhesives were evaluated in the manner as shown below. Results obtained are shown in Table 1.

CURABILITY

The composition was applied on the surface of glassine paper (basis weight: 60 g/m$^2$) so as to be in an amount of about 1.0 g/m$^2$ in terms of silicone solids, followed by formation of a cured silicone film in an circulating hot air drying oven of 180° C. Evaluation of the curability was based on the curing time (several seconds) required until the film came not to be rubbed off and not to blur, even when the film surface was rubbed with fingers.

The above evaluation was carried out on the composition available within 1 hour after preparation of the composition, and the composition stored for 1 day at 25° C.

RELEASE PROPERTIES

The composition was applied on the surface of glassine paper (basis weight: 60 g/m$^2$) so as to be in an amount of about 1.0 g/m$^2$ in terms of silicone solids, followed by formation of a cured silicone film in a circulating hot air drying oven of 180° C. The time required for the formation of the cured film was measured as minimum curing seconds. A commercially available kraft tape coated on its one side with an adhesive (available from Nitto Electric Industrial Co., Ltd) was sticked on the film surface, and pressed against it for 20 hours under a pressure of 20 g/cm$^2$ and at 50° C., followed by aging for 1 hour at 25° C., and thereafter cut into strips 5 cm wide to prepare test specimens. Measured was the force (g) required for peeling the kraft paper from the silicone film when the kraft paper was pulled at an angle of 180° C. and a peeling speed of 0.3 m/min with use of a tensile test machine.

RESIDUAL ADHESIVE PROPERTIES

Test specimens were prepared in the same manner in the measurement of the release properties. A polyester tape coated with an adhesive (trade name: Lumilar 31B; available from Nitto Electric Industrial Co., Ltd) was sticked on the surface of the cured silicone film and subjected to heating treatment for 2 hours at 70° C., and thereafter the polyester tape was peeled from the specimen and sticked on a stainless steel sheet. Thereafter the polyester tape was peeled from the stainless steel sheet at an angle of 180° C. and a peeling speed of 0.3 m/min to ceasure the force (F) (g) required for peeling. On the other hand, after a control standard polyester tape was sticked on a stainless steel sheet, the force (g) required for peeling was measured to measure the force ($F_0$) (g) required for the peeling of the control standard polyester tape. The residual adhesive properties of the adhesive was expressed by percentage of F to $F_0$.

COMPARATIVE EXAMPLE 1

Example 1 was repeated to prepare Emulsion Composition II, except that methylvinylpolysiloxane terminated with dimethylvinylsilyl groups at the both terminals in the molecule, having the backbone chain consisting of dimethylsiloxane units and having a viscosity of 3,000 cSt was used in place of the methylvinylpolysiloxane of Component (a-1) having a viscosity of 60 cSt, used in (i) of Example 1, and the respective properties were evaluated in the same manner. Results obtained are shown in Table 1.

COMPARATIVE EXAMPLE 2

Example 1 was repeated to prepare Emulsion Composition III, except that 2 parts of Component (C) platinum-vinylsiloxane complex salt only were used in place of the emulsion obtained in (ii) of Example 1, and the respective properties were evaluated in the same manner. Results obtained are shown in Table 1.

COMPARATIVE EXAMPLE 3

Using a homomixer and a homogenizer, 100 parts, 5 parts, 2 parts, 6 parts, 240 parts, 1 part and 0.2 part of Components (a-1), (b-1), (c-1), (d-1) and (e-1), the controlling agent and the antiseptic agent, respectively, used in Example 1 were simultaneously mixed to prepare Emulsion Composition IV. On Composition IV, the respective properties were evaluated in the same manner as in Example 1. Results obtained are shown in Table 1.

EXAMPLE 2

Materials used are shown below.
Component (a-2):
Methylvinylpolysiloxane terminated with dimethylvinylsilyl groups at the both terminals of the molecular chain, having the backbone chain consisting of 2.0 mol % of the unit:

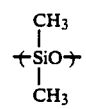

and 98.0 mol % of the unit:

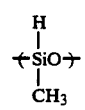

and having a viscosity of 1,000 cSt.
Component (b-2):
Methylhydrogenpolysiloxane terminated with trimethylsilyl groups at the both terminals of the molecular chain, having the backbone chain consisting of 70 mol % of the unit:

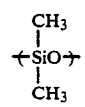

and 30 mol % of the unit:

$$\begin{array}{c} CH_3 \\ | \\ \text{-}SiO\text{-} \\ | \\ CH_3 \end{array}$$

and having a viscosity of 200 cSt.
Component (c-2):
A platinum-vinylsiloxane complex salt having a viscosity of 3.0 cSt (platinum content: 80 ppm).
Component (d-2):
Polyoxyethylene octyl phenyl ether having an HLB of 11.2, pH 5.2 and ionic conductivity of 5 $\mu\Omega^{-1}cm^{-1}$ (trade name: Newcall 860; available from Nippon Nyukazai Co., Ltd.).
Component (e-2): Water.

(i) By use of a homomixer and a homogenizer, mixed were 100 parts of Component (a-2), 10 parts of Component (b-2), 6 parts of Component (d-2), 480 parts of Component (e-2), and 4 parts of a controlling agent represented by the formula:

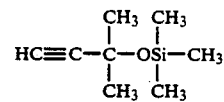

to obtain a homogeneous and white emulsion. The resulting emulsion had a viscosity of 1.5 cSt.

(ii) Using a three-one motor stirrer, mixed were 3.0 parts of Component (c-2) and 3.0 parts of Component (d-2), to obtain a transparent emulsion.

(iii) Emulsions obtained in (i) and (ii) were uniformly stirred and mixed to prepare an opaque white Emulsion Composition V.

The emulsion obtained in (i) was very stable without any change and maintained the initial properties even after storage for 1 year at 25° C.

On Composition V, the respective properties were evaluated in the same manner as in Example 1. Results obtained are shown in Table 1.

COMPARATIVE EXAMPLE 4

Example 2 was repeated to prepare Emulsion Composition VI, except that methylhydrogenpolysiloxane consisting of only the unit:

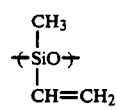

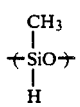

and having a viscosity of 100 cSt was used in place of Component (b-2) in (i) of Example 2, and the respective properties were evaluated in the same manner. Results obtained are shown in Table 1.

COMPARATIVE EXAMPLE 5

Example 2 was repeated to prepare Emulsion Composition VII, except that Component (d-2) in (i) and (ii) of Example 2 was replaced by polyoxyethylene octyl phenyl ether having an HLB of 11.2, pH 5.2 and ionic conductivity of 40 $\mu\Omega^{-1}cm^{-1}$ (trade name: Newcall 860; available from Nippon Nyukazai Co., Ltd.), and the respective properties were evaluated in the same manner. Results obtained are shown in Table 1.

EXAMPLE 3

Materials used are shown below.
Component (a-3):
Methylvinylpolysiloxane [A-1] terminated with dimethylvinylsilyl groups at the both terminals of the molecular chain, having the backbone chain consisting of dimethylsiloxane units, and having a viscosity of 95 cSt (vinyl groups: about 1.5 mol % of all the organic groups); and methylvinylpolysiloxane [A-2] terminated with dimethylvinylsilyl groups at the both terminals of the molecular chain, having the backbone chain consisting of 2.0 mol % of the unit:

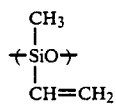

and 98.0 mol % of the unit:

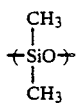

and having a viscosity of 550 cSt.
Component (b-3):
Methylhydrogenpolysiloxane terminated with dimethylhydrosilyl groups at the both terminals of the molecular chain, having the backbone chain consisting of 60 mol % of the unit:

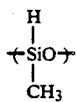

and 40 mol % of the unit:

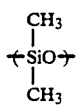

and having a viscosity of 20 cSt.
Component (c-3):

An alcohol-modified chloroplatinic acid having a viscosity of 1.2 cSt (platinum content: 200 ppm).
Component (d-3):
Polyoxyethylene tridecyl ether having an HLB of 10.5, pH 6.0 and ionic conductivity of 1.5 $\mu\Omega^{-1}cm^{-1}$ (trade name: Newcall N-1305; available from Nippon Nyukazai Co., Ltd.).
Component (e-3): Water.

(i) By use of a homomixer and a homogenizer, mixed were 80 parts of [A-1] of Component (a-3), 20 parts of [A-2] thereof, 15 parts of Component (b-3), 7 parts of Component (d-3), 300 parts of Component (e-3), and 0.2 part of a controlling agent represented by the formula:

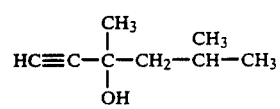

to obtain a homogeneous and white emulsion. The resulting emulsion had a viscosity of 2.5 cSt.

(ii) Using a three-one motor stirrer, mixed were 3 parts of Component (c-3) and 2.0 parts of Component (d-3), to obtain a transparent emulsion.

(iii) Emulsions obtained in (i) and (ii) were uniformly stirred and mixed to prepare an opaque white Emulsion Composition IX.

On Composition IX, the respective properties were evaluated in the same manner as in Example 1. Results obtained are shown in Table 1.

EXAMPLE 4

In Emulsion Composition I prepared in Example 1, 50 parts of an aqueous 10% solution of polyvinyl alcohol PA-18 having a saponification degree of 88 mol % (available from Shin-Etsu Chemical Co., Ltd.) were added and the mixture was thoroughly stirred to prepare Emulsion Composition X. On Composition X, the respective properties were evaluated in the same manner as in Example 1. Results obtained are shown in Table 1.

TABLE 1

| | Composition | Curability (sec) | | Release properties (g/cm) | Residual adhesive properties (%) |
|---|---|---|---|---|---|
| | | In 1 hour after preparation of composition | Stored for 1 day at 25° C. after preparation of composition | | |
| Example: | | | | | |
| 1 | I | 10–20 | 20–30 | 65 | 95 |
| Comparative Example: | | | | | |
| 1 | II | 200–250 | Not cured even after 300 | 20 | 62 |
| 2 | III | 150–200 | Not cured even after 300 | 170 | 88 |
| 3 | IV | 150–200 | Not cured even after 300 | 185 | 88 |
| Example: | | | | | |
| 2 | V | 10–20 | 20–30 | 83 | 95 |
| Comparative Example: | | | | | |
| 4 | VI | Not cured | — | — | — |
| 5 | VII | 20–30 | Not cured even after 300 | 70 | 88 |
| 6 | VIII | 200–300 | Not cured even after 300 | 160 | 85 |

TABLE 1-continued

| Example: | Composition | Curability (sec) In 1 hour after preparation of composition | Curability (sec) Stored for 1 day at 25° C. after preparation of composition | Release properties (g/cm) | Residual adhesive properties (%) |
|---|---|---|---|---|---|
| 3 | IX | 10-20 | 20-30 | 70 | 93 |
| 4 | X | 10-20 | 20-30 | 200 | 95 |

What is claimed is:

1. A process for preparing a silicone emulsion composition comprising the steps of:
emulsifying:
100 parts by weight of Component (A), at least one polymer selected from an organovinylpolysiloxane represented by Formula (I) shown below and an organovinylpolysiloxane represented by Formula (II) shown below:

Formula (I):

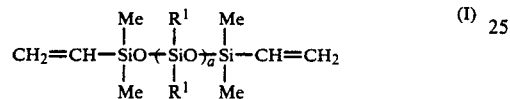

wherein $R^1$ may be the same or different and represents a monovalent hydrocarbon group containing no aliphatic unsaturated bond; and a represents an integer such that said polymer represented by Formula (I) has viscosity of from 25 to 95 cSt at 25° C.;

Formula (II):

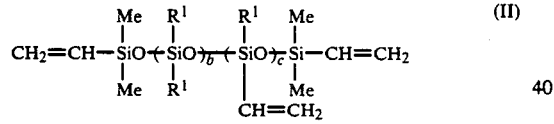

wherein $R^1$ may be the same or different and have the same definition as in Formula (I); and b and c each represent an integer such that from 1.0 to 10 mol % of all organic groups is comprised of vinyl groups and said polymer represented by Formula (II) has a viscosity of from 30 to 5,000 cSt at 25° C.;

from 1 to 50 parts by weight of Component (B), an organohydrogenpolysiloxane represented by Formula (III) shown below and having in its molecule at least 3 hydrogen atoms bonded to silicon atoms:

Formula (III):

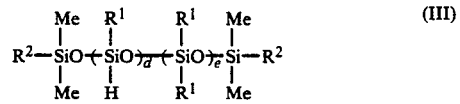

wherein $R^1$ may be the same or different and have the same definition as in Formula (I); $R^2$ may be the same or different and represents a hydrogen atom or a monovalent hydrocarbon group; d and e each represent an integer such that from 10 to 47.5 mol % of all the monovalent atoms and groups bonded to silicon atoms in said polymer is comprised of hydrogen atoms and said polymer has a viscosity of from 5 to 200 cSt at 25° C., provided that e represents an integer of 1 or more; said Component (E) water; and from 1 to 10 parts by weight of Component (D), a nonionic emulsifying agent having an average HLB of from 10 to 20, pH of 6.5 or less and an ionic conductivity of 30 $\mu\Omega^{-1}cm^{-1}$ or less, to obtain a first emulsion composition;

emulsifying from 0.5 parts to 5 parts by weight of Component (C) a platinum catalyst in a liquid state having a viscosity of 10 cSt or less at 25° C. and from 0.5 to 5 parts by weight of said Component (D) nonionic emulsifying agent to obtain a second emulsion composition; and mixing said first and second emulsion compositions.

2. The process according to claim 1, wherein;
100 parts parts by weight of said Component (A) organovinylpolysiloxane;
from 1 to 50 parts by weight of said Component (B) organohydrogenpolysiloxane;
said Component (E) water; and
from 1 to 10 parts by weight of said Component (D) nonionic emulsifying agent are used to prepare the first emulsion composition; and
from 0.5 part to 5 parts by weight of said Component (C) platinum catalyst and from 0.5 to 5 parts by weight of said Component (D) nonionic are used to prepare the second emulsion composition.

* * * * *